(12) United States Patent
Yan

(10) Patent No.: US 9,991,923 B2
(45) Date of Patent: Jun. 5, 2018

(54) BRACKET-TYPE WIRELESS CHARGER

(71) Applicant: SHENZHEN WIPOLM WIRELESS TECHNOLOGY CO., LTD, Shenzhen, Guangdong (CN)

(72) Inventor: Xinmin Yan, Shenzhen (CN)

(73) Assignee: SHENZHEN WIPOLM WIRELESS TECHNOLOGY CO., LTD, Shenzhen, Guangdong (CN)

(*) Notice: Subject to any disclaimer, the term of this patent is extended or adjusted under 35 U.S.C. 154(b) by 0 days. days.

(21) Appl. No.: 15/493,357

(22) Filed: Apr. 21, 2017

(65) Prior Publication Data
US 2017/0222680 A1    Aug. 3, 2017

Related U.S. Application Data

(63) Continuation of application No. PCT/CN2015/091956, filed on Oct. 15, 2015.

(30) Foreign Application Priority Data

Oct. 22, 2014 (CN) .......................... 2014 2 0612525

(51) Int. Cl.
H04B 1/38 (2015.01)
H02J 7/02 (2016.01)
(Continued)

(52) U.S. Cl.
CPC .......... *H04B 1/3883* (2013.01); *H02J 7/0027* (2013.01); *H02J 7/025* (2013.01); *H04B 5/0037* (2013.01)

(58) Field of Classification Search
CPC . H02J 17/00; H02J 7/02; H02J 7/0027; H04B 1/3883; H04B 5/0037
See application file for complete search history.

(56) References Cited

U.S. PATENT DOCUMENTS 5,691,618 A * 11/1997 Kobayashi ............ H02J 7/0042
320/115
9,118,749 B2 * 8/2015 Kim .................... H04M 1/0254
(Continued)

FOREIGN PATENT DOCUMENTS

CN 201638916 U 11/2010
CN 203466598 U 3/2014
(Continued)

OTHER PUBLICATIONS

Google Translation of WO 2013165053 A1, "Wireless charging device for portable terminal having holding function", Sok C. Choi et al, Nov. 7, 2013.*
State Intellectual Property Office of the P.R. China (ISR/CN), "International Search Report for PCT/CN2015/091956", China, Jan. 22, 2016.

*Primary Examiner* — Duc M Nguyen
(74) *Attorney, Agent, or Firm* — Locke Lord LLP; Tim Tingkang Xia, Esq.

(57) ABSTRACT

A bracket-type wireless charger, including a box body having a charging circuit and a transmitting plate having a transmitting coil. An adapter plate is arranged between the transmitting plate and the box body. An upper end of the adapter plate is hinged through interference fit to a lower part of a back surface of the transmitting plate. A lower end is hinged through interference fit to a middle part of a top surface of the box body. The box body has a groove for accommodating the adapter plate. The two ends of the adapter plate are hinged through interference fit to the box body and the transmitting plate respectively, and the position and an inclination angle of the transmitting plate relative to the box body can be adjusted through rotation of the adapter plate, so as to adapt to the positions of wireless charging receiving coils of different electronic equipment.

11 Claims, 9 Drawing Sheets

(51) Int. Cl.
*H04B 1/3883* (2015.01)
*H02J 7/00* (2006.01)
*H04B 5/00* (2006.01)

(56) References Cited

U.S. PATENT DOCUMENTS

| | | | | |
|---|---|---|---|---|
| 9,319,086 | B2* | 4/2016 | Wong | H04B 1/3883 |
| 2007/0047198 | A1* | 3/2007 | Crooijmans | G06F 1/1632 |
| | | | | 361/679.41 |
| 2013/0107126 | A1* | 5/2013 | Nonomura | H04N 5/64 |
| | | | | 348/725 |
| 2015/0097519 | A1* | 4/2015 | Chen | H02J 7/025 |
| | | | | 320/108 |
| 2015/0326053 | A1* | 11/2015 | Amano | H02J 17/00 |
| | | | | 320/108 |
| 2016/0072327 | A1* | 3/2016 | Knutson | G06F 1/1632 |
| | | | | 320/108 |

FOREIGN PATENT DOCUMENTS

| | | |
|---|---|---|
| CN | 203481871 U | 3/2014 |
| CN | 203660606 U | 6/2014 |
| CN | 103916500 A | 7/2014 |
| CN | 204190438 U | 3/2015 |
| JP | H06165396 A | 6/1994 |
| KR | 101285084 B1 | 7/2013 |
| WO | WO 2013165053 A1 * 11/2013 ............ H02J 17/00 |

\* cited by examiner

BRACKET-TYPE WIRELESS CHARGER

CROSS REFERENCE TO RELATED APPLICATIONS

The present application is a continuation of international application no. PCT/CN2015/091956, filed on Oct. 15, 2015, which claims priority to China Patent Application no. 201420612525.6, filed on Oct. 22, 2014, both of which are hereby incorporated by reference in their entireties.

TECHNICAL FIELD

The invention relates to a wireless charger, and more particularly, to a bracket-type wireless charger. The invention relates to a wireless charger, and more particularly, to a bracket-type wireless charger.

BACKGROUND ART

A wireless charger refers to equipment that uses an electromagnetic wave induction principle to charge, a transmitting end of the wireless charger is provided with a transmitting coil, and a receiving end of an electric appliance is provided with a receiving coil. The current wireless charger is mainly divided into two types: a straight-type wireless charger and a bracket-type wireless charger. The electronic equipment is placed flatly when the straight-type wireless charger is charged, so that it is unable to be convenient to watch the mobile phone, and it is unstable to position the mobile phone while charging, which is not conducive to charging in a vehicle-mounted state or other moving states.

The bracket-type wireless charger is commonly composed of a box body and a transmitting plate, a transmitting coil is arranged in the transmitting plate, and an electronic equipment positioning structure is arranged on the box body. The existing bracket-type wireless charger is also divided into two types: one is a fixed structure type bracket, which is only for the electronic equipment with single specification, is in a fixed charging placing state, and does not adapt to the electronic equipment with other specifications; the other is a joint positioning structure type bracket, a positioning structure is pulled out by the existing wireless charger, in a mode of engaging a gear with racks, or a positioning structure is adjusted by fixing a blocking position, the structure is more complicated, and it is unable to conveniently and quickly adjust the position of the transmitting plate, so as to adapt to the position of the receiving coil of the electronic equipment with different specifications, the charging efficiency is not affected, and it is even unable to charge if the joint positioning is not adapted.

Therefore, how to design a bracket-type wireless charger having a simple structure and capable of conveniently adjusting the position of the transmitting plate is a technical problem that urgently needs to be addressed.

SUMMARY OF THE INVENTION

Aiming at the above-mentioned problems, the invention provides a bracket-type wireless charger, which is simple in structure and is able to be convenient to adjust the position of a transmitting plate. The invention adapts to a receiving coil of such electric appliances as mobile phones with different specifications and table personal computers, and the transmitting plate is adjusted in a joint-free way.

The technical solution provided by the invention is to design a bracket-type wireless charger comprising a box body provided with a charging circuit and a transmitting plate provided with a transmitting coil, wherein an adapter plate is arranged between the transmitting plate and the box body, an upper end of the adapter plate is hinged through interference fit to a lower part of a back surface of the transmitting plate, and a lower end of the adapter plate is hinged through interference fit to a middle part of a top surface of the box body, and the box body is provided with a groove for accommodating the adapter plate.

The two ends of the adapter plate are arc-shaped, the groove at the top surface of the box body and a back surface of the transmitting plate are provided with a recessed portion fit with arcs at the two ends of the adapter plate respectively; the recessed portion is internally provided with two parallel strip-type through holes, a transverse bar between two strip-type through holes is provided with a positioning lug protruding towards arc surfaces of the two ends of the adapter plate.

The box body is provided with a placing groove fit with the shape of the transmitting plate, a bottom surface of one end of the placing groove is provided with an equipment positioning groove parallel with the bottom of the transmitting plate, and the equipment positioning groove passes through the box body.

The bottom of the top surface of the transmitting plate is provided with a notch, and the placing groove is provided with a lug fit with the notch.

The bracket-type wireless charger further comprises a charging plug, wherein a bottom surface of the equipment positioning groove is provided with a positive and negative electrode electrically connected with the charging circuit, one end of the charging plug is provided with a plug-in terminal plugged in a socket of an electric appliance, while the other end is provided with a metal sheet capable of being electrically connected with the positive and negative electrode, and the plug-in terminal is connected with the positive and negative electrode through a circuit arranged in the charging plug.

The bottom surface of the equipment positioning groove is provided with a plug positioning groove capable of accommodating the charging plug, and the positive and negative electrode is arranged in the plug positioning groove Compared with the prior art, the adapter plate is arranged between the box body and the transmitting plate, the two ends of the adapter plate are hinged through interference fit to the box body and the transmitting plate respectively, and the position and an inclination angle of the transmitting plate relative to the box body can be adjusted through rotation of the adapter plate, so as to adapt to the positions of wireless charging receiving coils of different electronic equipment, and the charging efficiency is ensured. Simultaneously, as an adapter plate hinging mode is used, the structure is relatively simple, and it is very convenient to operate.

BRIEF DESCRIPTION OF THE DRAWINGS

The present invention will be described in detail as below in conjunction with embodiments and drawings, wherein.

DETAILED DESCRIPTION OF THE PREFERRED EMBODIMENTS

As shown in FIG. 1 to FIG. 4, a bracket-type wireless charger provided by the invention comprises a box body 1 provided with a charging circuit and a transmitting plate 2 provided with a transmitting coil, wherein an adapter plate 3 is arranged between the transmitting plate 2 and the box body 1, an upper end of the adapter plate 3 is hinged through interference fit to a lower part of a back surface of the transmitting plate 2, and a lower end of the adapter plate 3 is hinged through interference fit to a middle part of a top surface of the box body 1, and the box body 1 is provided with a groove 11 for accommodating the adapter plate 3. The position and an inclination angle of the transmitting plate 2 relative to the box body 1 can be adjusted through rotation of the adapter plate 3, so as to adapt to the positions of wireless charging receiving coils of different electronic equipment, and the charging efficiency is ensured.

Figure 4:
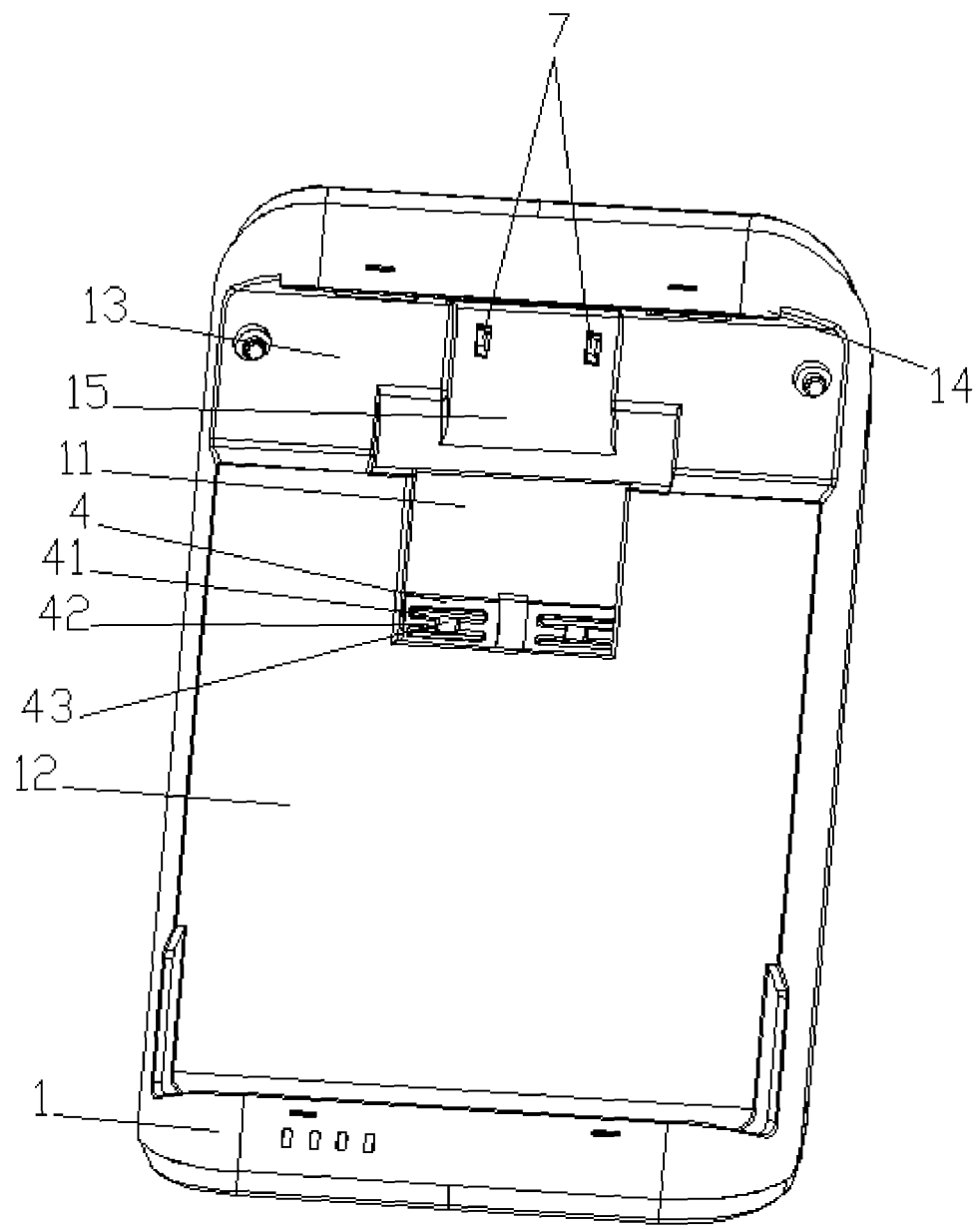
FIG. 4 is a space diagram of a box body of the invention.
Figure 5:
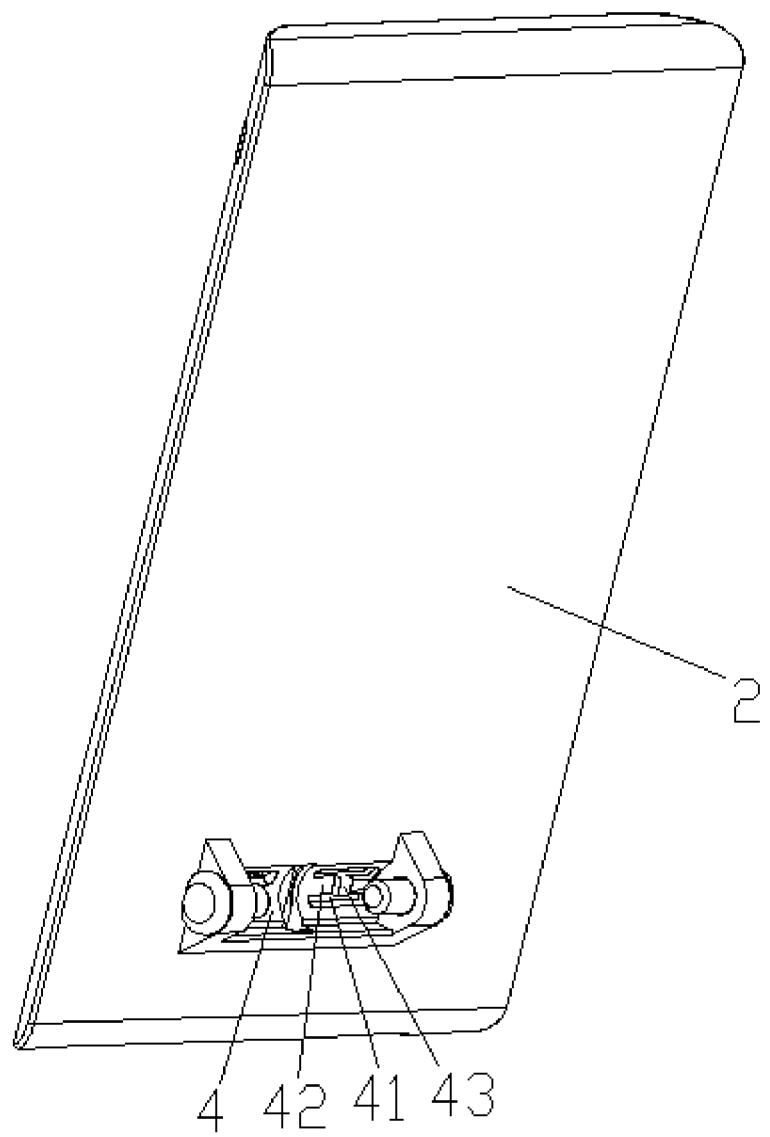
FIG. 5 is a space diagram of the transmitting plate of the invention.
Figure 6:
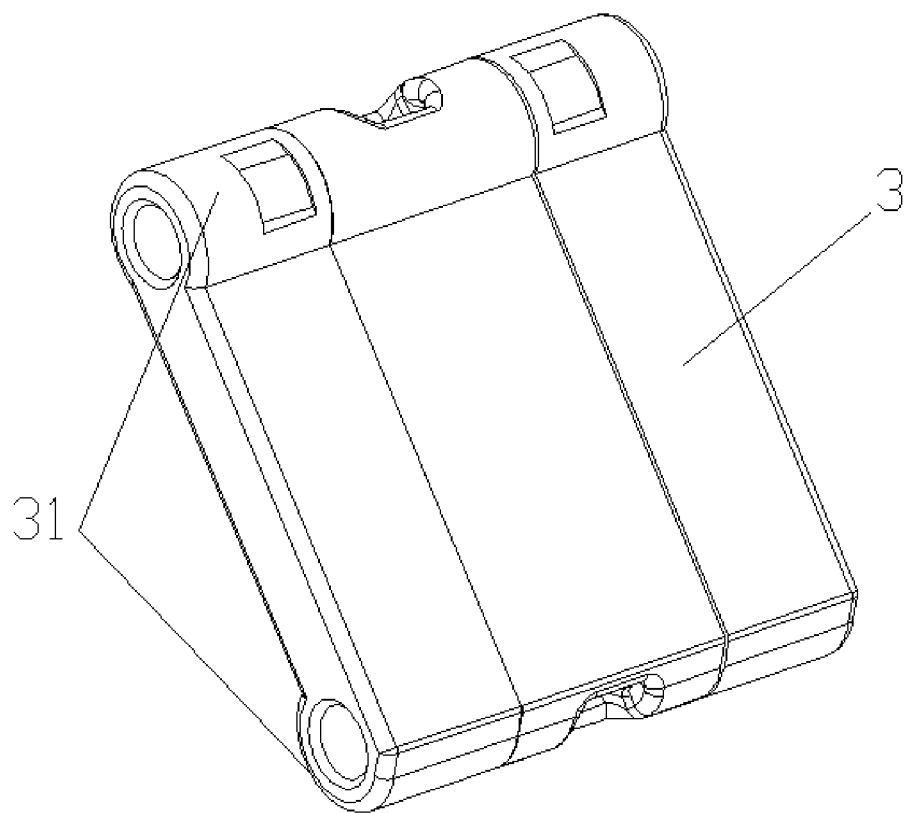
FIG. 6 is a space diagram of an adapter plate of the invention.

As shown in FIG. 4 to FIG. 6, the two ends of the adapter plate 3 are arc-shaped, the groove 11 at the top surface of the box body and a back surface of the transmitting plate 2 are provided with a recessed portion 4 fit with arcs 31 at the two ends of the adapter plate 3 respectively, and both sides of the arcs 31 at the ends of the adapter plate are hinged through interference fit to side walls in the recessed portion 4. The recessed portion 4 is internally provided with two parallel strip-type through holes 41, a transverse bar 42 between two strip-type through holes is provided with a positioning bump 43 protruding towards arc surfaces of the two ends of the adapter plate 3. The positioning bump 43 on the transverse bar 42 is supported against the arcs 31 at the ends of the adapter plate. The positioning bump 43 generates a resistance when the adapter plate 3 rotates. After moving to adjust the charging position, the transmitting plate 2 is uneasy to drive by the gravity of the electronic equipment 5 to change, so as to ensure the supporting and charging stability of the electronic equipment 5. Moreover, as the two ends of the transverse bar 42 are hollowed with through holes, the transverse bar 42 is pushed and pulled with an external force to generate certain elastic deformation, so that the resistance applied to the adapter plate 3 while rotating is not too large. It is difficult to adjust the transmitting plate 2. Moreover, the abrasion of the positioning bump 43 under friction can also be reduced, so that the service life is prolonged.

Figure 1:
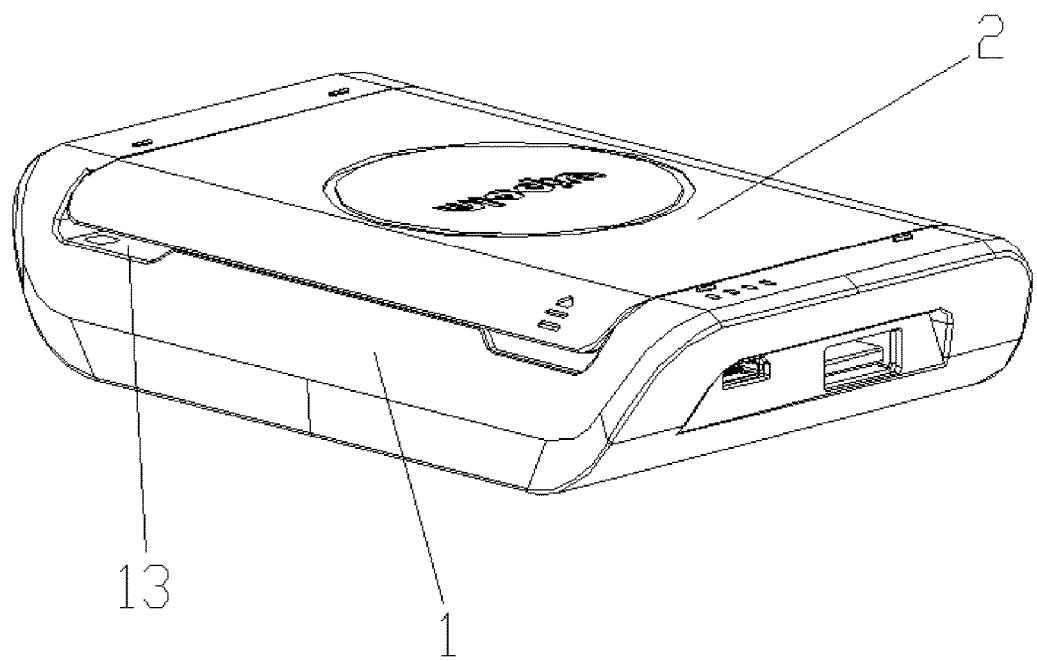
FIG. 1 is a space diagram while the invention is in an unused state.
Figure 2:
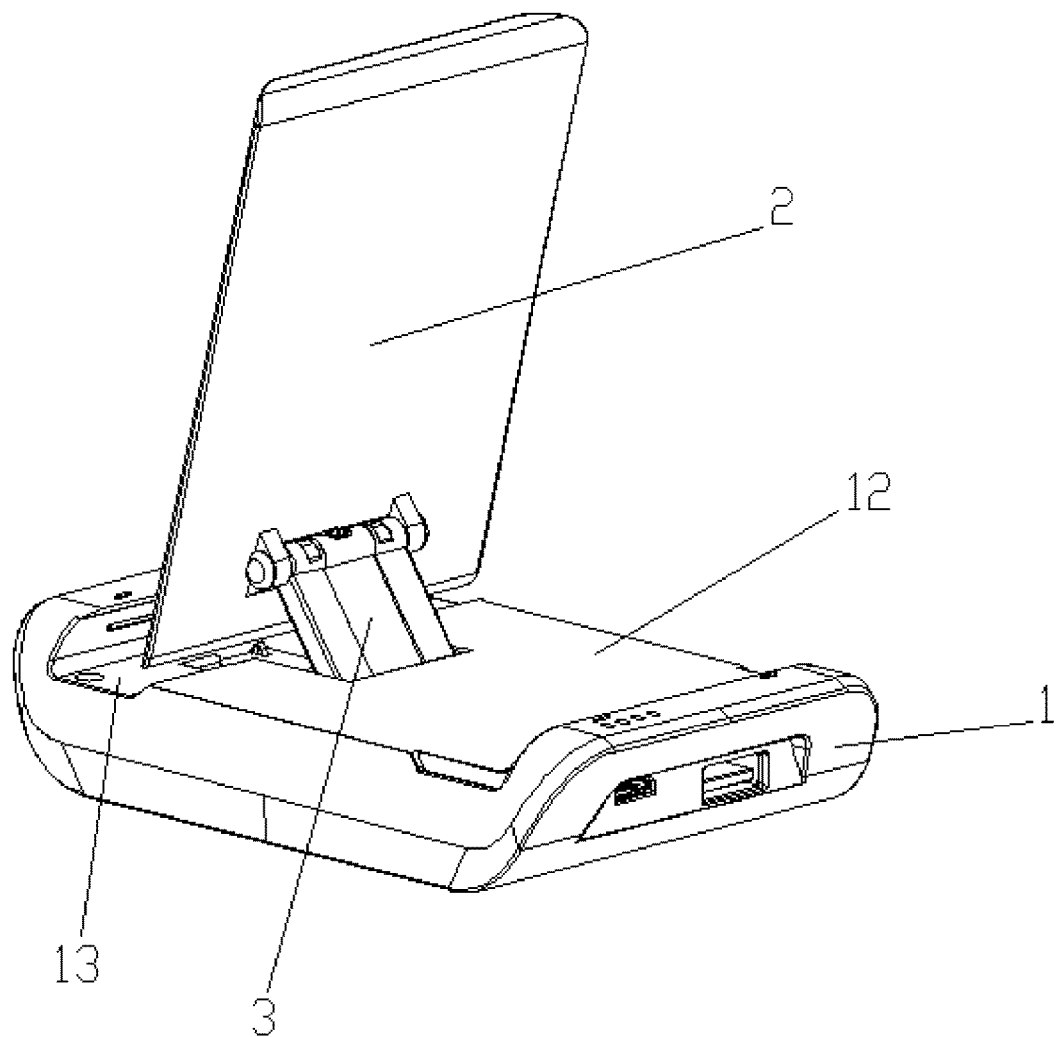
FIG. 2 is a three-dimensional schematic diagram while the invention is in a used state.
Figure 7:
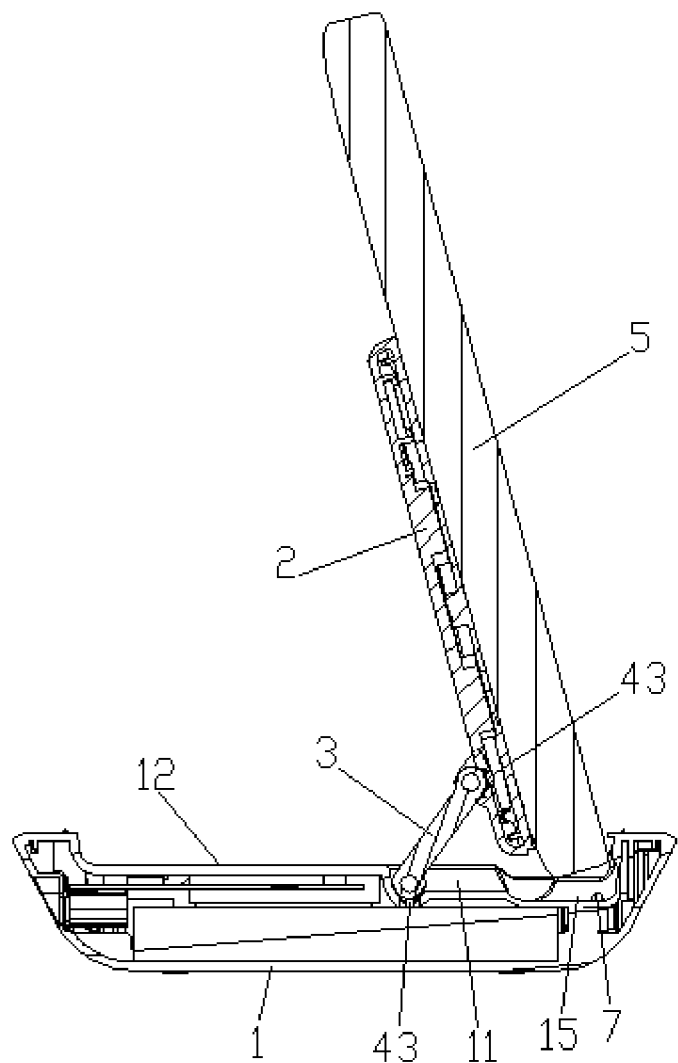
FIG. 7 is a sectional schematic diagram while using wireless charging in the invention.

As shown in FIG. 4, the box body 1 is provided with a placing groove 12 fit with the shape of the transmitting plate 2, a bottom surface of one end of the placing groove 12 is provided with an equipment positioning groove 13 parallel with the bottom of the transmitting plate 2, and the equipment positioning groove 13 passes through the box body 1. As shown in FIG. 1, when the charger is unused, the adapter plate 3 is pressed by the transmitting plate 2 in the groove 11, the transmitting plate 2 is located in the placing groove 12 and the top surface thereof is flush with the box body 1; at this time, both the equipment positioning groove 13 and the adapter plate 3 are covered by the transmitting plate 2, the transmitting plate 2 and the box body 1 form an integrate straight-type article, which has attractive shape and is convenient to carry. As shown in FIG. 7, when the charger is used, the transmitting plate 2 is pulled out of the placing groove 12; at this time, the equipment positioning groove 13 is exposed out, the back surface of the electronic equipment 5 is pasted on the transmitting plate 2, a bottom end of the electronic equipment 5 is supported against the equipment positioning groove 13, the inclination angle and position of the transmitting plate 2 are adjusted (as shown in FIG. 3) until the wireless charging receiving coil in the electronic equipment 5 is aligned with the coil in the transmitting plate 2, so that it is very convenient and is able to be suitable for charging all kinds of electronic equipment.

Figure 3:
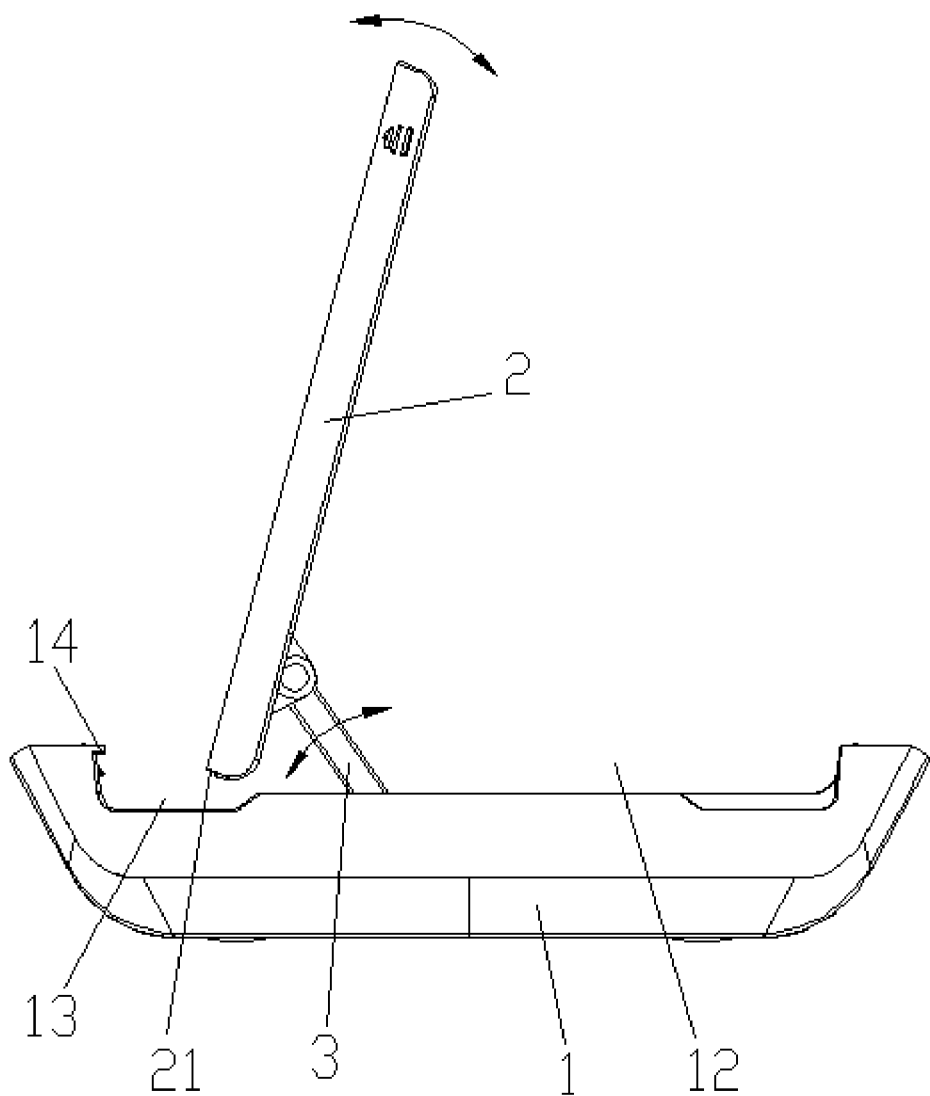
FIG. 3 is a schematic diagram of adjusting the position of a transmitting plate while the invention is used.

Preferably, as shown in FIG. 3, the bottom of the top surface of the transmitting plate 2 is provided with a notch 21, and the placing groove 12 is provided with a lug 14 fit with the notch 21. In an unused state, the lug 14 on the box body 1 just extends in the notch 21, and the transmitting plate 2 is positioned simply, so as to prevent the transmitting plate 2 from being touched innocently to open.

Figure 8:
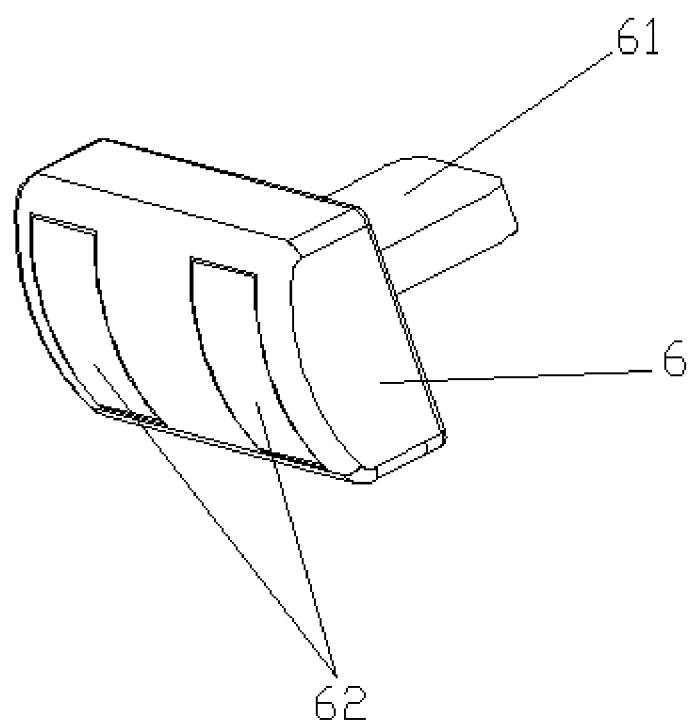
FIG. 8 is a space diagram of a charging plug of the invention.
Figure 9:
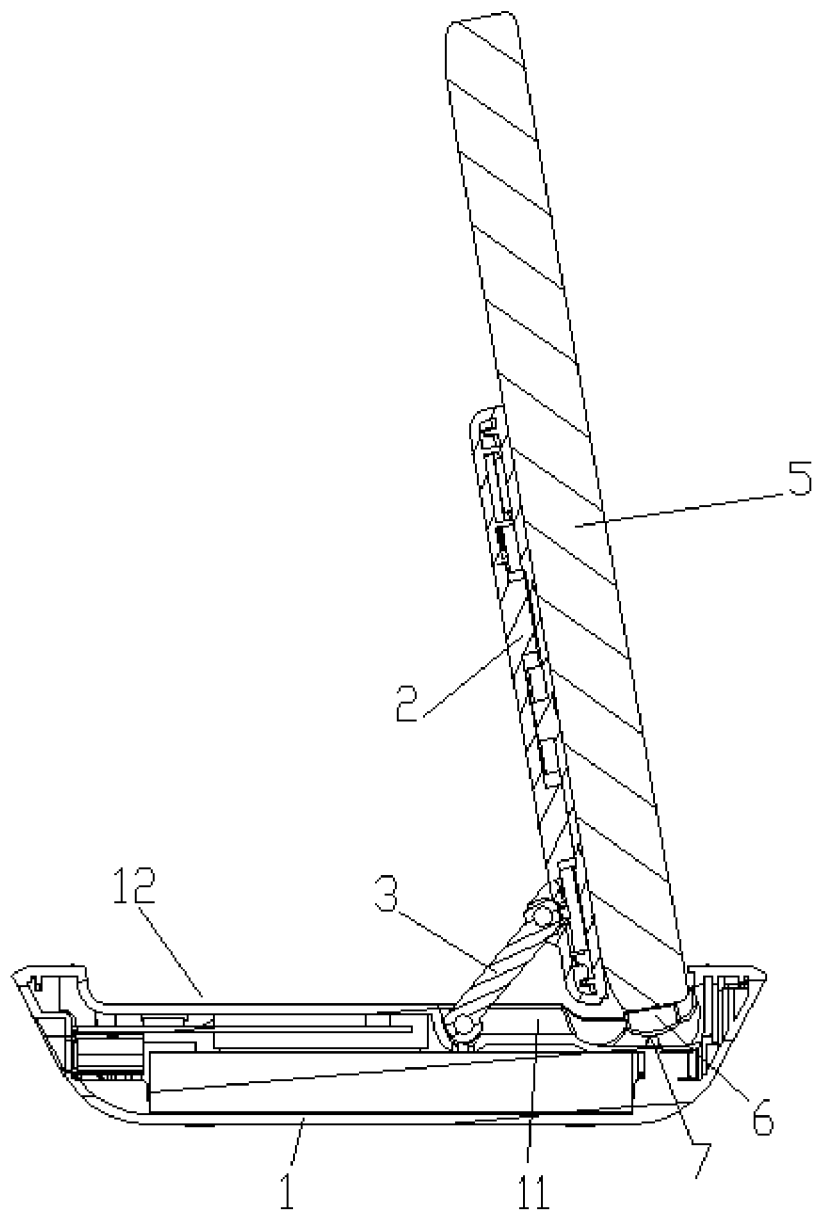
FIG. 9 is a sectional schematic diagram while using the charging plug in the invention.

More preferably, as shown in FIG. 8 and FIG. 9, the bracket-type wireless charger further comprises a charging plug 6, wherein a bottom surface of the equipment positioning groove 13 is provided with a positive and negative electrode 7 electrically connected with the charging circuit, one end of the charging plug 6 is provided with a plug-in terminal 61 plugged in a socket of an electric appliance, while the other end is provided with a metal sheet 62 capable of being electrically connected with the positive and negative electrode 7, and the plug-in terminal 61 is connected with the positive and negative electrode 7 through a circuit arranged in the charging plug 6. When the electronic equipment 5 is not provided with the wireless charging receiving coil, and after the plug-in terminal 61 is plugged in the charging socket of the electronic equipment 5, the metal sheet 62 of the charging plug is flush with the positive-negative electrode 7 of the charger, and the transmitting plate 2 is adjusted to support the electronic equipment 5. The bottom surface of the equipment positioning groove 13 is provided with a plug positioning groove 15 capable of accommodating the charging plug 6, the positive and negative electrode 7 is arranged in the plug positioning groove 15, it is conveniently to quickly position and abut the charging plug 6 and the positive and negative electrode 7 of the charger through the arrangement of the plug positioning groove 15, and the positioning support between electronic equipment 5 and the equipment positioning groove 13 is not affected.

The above is the preferred embodiments of the invention merely, but not intended to limit the invention. Any modifications, equivalent replacements, improvements and the like made within the spirit and principle of the invention shall all fall within the protection scope of the invention.

What is claimed is:
1. A bracket-type wireless charger, comprising
a box body (1) provided with a charging circuit, and
a transmitting plate (2) provided with a transmitting coil,
wherein an adapter plate (3) is arranged between the transmitting plate (2) and the box body (1), an upper end of the adapter plate (3) is hinged through interference fit to a lower part of a back surface of the transmitting plate (2), and a lower end is hinged through interference fit to a middle part of a top surface of the box body (1), and the box body (1) is provided with a groove (11) for accommodating the adapter plate;

wherein a position and an inclination angle of the transmitting plate (2) relative to the box body (1) is adjustable through rotation of the adapter plate (3).

2. The bracket-type wireless charger according to claim 1, wherein the two ends of the adapter plate (3) are arc-shaped, the groove (11) at the top surface of the box body and a back surface of the transmitting plate (2) are provided with a recessed portion (4) fit with arcs at the two ends of the adapter plate (3) respectively; the recessed portion (4) is internally provided with two parallel strip-type through holes (41), a transverse bar (42) between two strip-type through holes is provided with a positioning bump (43) protruding towards arc surfaces of the two ends of the adapter plate.

3. The bracket-type wireless charger according to claim 1, wherein the box body (1) is provided with a placing groove (12) fit with the shape of the transmitting plate (2), a bottom surface of one end of the placing groove (12) is provided with an equipment positioning groove (13) parallel with the bottom of the transmitting plate (2), and the equipment positioning groove (13) passes through the box body (1).

4. The bracket-type wireless charger according to claim 3, wherein the bottom of the top surface of the transmitting plate (2) is provided with a notch (21), and the placing groove (12) is provided with a lug (14) fit with the notch.

5. The bracket-type wireless charger according to claim 3, further comprising a charging plug (6), wherein a bottom surface of the equipment positioning groove (13) is provided with a positive and negative electrode (7) electrically connected with the charging circuit, one end of the charging plug (6) is provided with a plug-in terminal (61) plugged in a socket of an electric appliance, while the other end is provided with a metal sheet (62) capable of being electrically connected with the positive and negative electrode (7), and the plug-in terminal (61) is connected with the positive and negative electrode (7) through a circuit arranged in the charging plug (6).

6. The bracket-type wireless charger according to claim 5, wherein the bottom surface of the equipment positioning groove (13) is provided with a plug positioning groove (15) capable of accommodating the charging plug (6), and the positive and negative electrode (7) is arranged in the plug positioning groove (15).

7. A bracket-type wireless charger, comprising:
a box body (1) provided with a charging circuit; and
a transmitting plate (2) provided with a transmitting coil,
wherein an adapter plate (3) is arranged between the transmitting plate (2) and the box body (1), an upper end of the adapter plate (3) is hinged through interference fit to a lower part of a back surface of the transmitting plate (2), and a lower end is hinged through interference fit to a middle part of a top surface of the box body (1), and the box body (1) is provided with a groove (11) for accommodating the adapter plate, wherein the two ends of the adapter plate (3) are arc-shaped, the groove (11) at the top surface of the box body and a back surface of the transmitting plate (2) are provided with a recessed portion (4) fit with arcs at the two ends of the adapter plate (3) respectively; the recessed portion (4) is internally provided with two parallel strip-type through holes (41), a transverse bar (42) between two strip-type through holes is provided with a positioning bump (43) protruding towards arc surfaces of the two ends of the adapter plate.

8. A bracket-type wireless charger, comprising:
a box body (1) provided with a charging circuit; and
a transmitting plate (2) provided with a transmitting coil,
wherein an adapter plate (3) is arranged between the transmitting plate (2) and the box body (1), an upper end of the adapter plate (3) is hinged through interference fit to a lower part of a back surface of the transmitting plate (2), and a lower end is hinged through interference fit to a middle part of a top surface of the box body (1), and the box body (1) is provided with a groove (11) for accommodating the adapter plate, wherein the box body (1) is provided with a placing groove (12) fit with the shape of the transmitting plate (2), a bottom surface of one end of the placing groove (12) is provided with an equipment positioning groove (13) parallel with the bottom of the transmitting plate (2), and the equipment positioning groove (13) passes through the box body (1).

9. The bracket-type wireless charger according to claim 8, wherein the bottom of the top surface of the transmitting plate (2) is provided with a notch (21), and the placing groove (12) is provided with a lug (14) fit with the notch.

10. The bracket-type wireless charger according to claim 8, further comprising a charging plug (6), wherein a bottom surface of the equipment positioning groove (13) is provided with a positive and negative electrode (7) electrically connected with the charging circuit, one end of the charging plug (6) is provided with a plug-in terminal (61) plugged in a socket of an electric appliance, while the other end is provided with a metal sheet (62) capable of being electrically connected with the positive and negative electrode (7), and the plug-in terminal (61) is connected with the positive and negative electrode (7) through a circuit arranged in the charging plug (6).

11. The bracket-type wireless charger according to claim 10, wherein the bottom surface of the equipment positioning groove (13) is provided with a plug positioning groove (15) capable of accommodating the charging plug (6), and the positive and negative electrode (7) is arranged in the plug positioning groove (15).

* * * * *